(12) United States Patent
Ono et al.

(10) Patent No.: US 7,209,668 B2
(45) Date of Patent: Apr. 24, 2007

(54) DATA TRANSMISSION APPARATUS, PHOTOELECTRIC CONVERSION CIRCUIT AND TEST APPARATUS

(75) Inventors: Atsushi Ono, Tokyo (JP); Toshiyuki Okayasu, Tokyo (JP)

(73) Assignee: Advantest Corporation, Tokyo (JP)

( * ) Notice: Subject to any disclaimer, the term of this patent is extended or adjusted under 35 U.S.C. 154(b) by 137 days.

(21) Appl. No.: 10/820,628

(22) Filed: Apr. 8, 2004

(65) Prior Publication Data
US 2005/0025498 A1 Feb. 3, 2005

Related U.S. Application Data

(63) Continuation of application No. PCT/JP02/10245, filed on Oct. 2, 2002.

(30) Foreign Application Priority Data
Oct. 9, 2001 (JP) .............................. 2001-312050

(51) Int. Cl.
*H04B 10/04* (2006.01)
(52) U.S. Cl. ........................ 398/182; 210/208
(58) Field of Classification Search ............... 398/183, 398/210, 208; 372/29.014, 29.015, 29.016
See application file for complete search history.

(56) References Cited

U.S. PATENT DOCUMENTS

| | | | |
|---|---|---|---|
| 4,467,192 A * | 8/1984 | Velo | 250/214 A |
| 4,945,541 A * | 7/1990 | Nakayama | 372/31 |
| 5,526,164 A * | 6/1996 | Link et al. | 398/195 |
| 5,737,111 A * | 4/1998 | Mori et al. | 398/209 |
| RE36,491 E * | 1/2000 | Gilliland et al. | 372/38.04 |
| 6,381,054 B1 * | 4/2002 | Okayasu et al. | 398/140 |
| 6,396,614 B1 * | 5/2002 | Yoshizawa | 398/202 |
| 6,583,671 B2 * | 6/2003 | Chatwin | 330/279 |

(Continued)

FOREIGN PATENT DOCUMENTS

JP 60/144034 7/1985

(Continued)

OTHER PUBLICATIONS

Office Action dated Mar. 1, 2006 issued in Japanese Patent Application No. 2001-312050 (3 pages) with English translation (3 pages).

(Continued)

*Primary Examiner*—Kenneth Vanderpuye
*Assistant Examiner*—Ken Malkowski
(74) *Attorney, Agent, or Firm*—Osha-Liang LLP (57) ABSTRACT

The data transmission apparatus for performing data communication based on optical transmission includes a transmitting unit for converting and sending electric communication data, which is to be transmitted, into optical communication data, and a photoelectric conversion circuit for receiving the optical communication data and converting the received optical communication data into electric communication data, wherein the photoelectric conversion circuit includes a photodiode for generating a current based on the optical communication data, and a variable current supply for subtracting a predetermined current from the current generated by the photodiode. In addition, a bias current of a laser diode of each transmitting unit is set to a current larger than a laser oscillation threshold current so as to reduce the deviation of a light emission delay time of each laser diode.

7 Claims, 4 Drawing Sheets

U.S. PATENT DOCUMENTS 6,684,032 B1 * 1/2004 Umeda .................. 398/202
6,907,702 B2 * 6/2005 Gilbert et al. .............. 52/555

FOREIGN PATENT DOCUMENTS

| | | |
|---|---|---|
| JP | 05/292026 | 11/1993 |
| JP | 07/245540 | 9/1995 |
| JP | 08/279783 | 10/1996 |
| JP | 10-22521 | 1/1998 |
| JP | 10-142298 | 5/1998 |
| JP | 10/294700 | 11/1998 |
| JP | 11/205047 | 7/1999 |
| JP | 11/305080 | 11/1999 |
| JP | 2000/049717 | 2/2000 |
| JP | 2001/53376 | 2/2001 |

OTHER PUBLICATIONS

Patent Abstracts of Japan, publication No. 10-294700, publication date Nov. 4, 1998, (2 pgs.).
Patent Abstracts of Japan, publication No. 11-205047, publication date Jul. 30, 1999, (2 pgs.).
Patent Abstracts of Japan, publication No. 60/144034, publication date Jul. 30, 1985, (2 Pgs.).
Patent Abstracts of Japan, publication No. 07/245540, publication date Sep. 19, 1995 (1 pg.).
Patent Abstracts of Japan, publication No. 2000-049717, publication date Feb. 18, 2000, (1 pg.).
Patent Abstracts of Japan, publication No. 08-279783, publication date Oct. 22, 1996, (1 pg.).
Patent Abstracts of Japan, publication No. 05-292026, publication date Nov. 5, 1993, (1 pg.).
Patent Abstracts of Japan, publication No. 11-305080, publication date0 Nov. 5, 1999, (1 pg.).
Patent Abstracts of Japan, publication No. 2001-053376, publication date Feb. 23, 2001,(1 pg.).
International Search Report, publication No. WO 03/032529 A1, publication date Apr. 17, 2003, (3 pgs.).
Office Action dated Mar. 29, 2004 (2 pgs.).

* cited by examiner

DATA TRANSMISSION APPARATUS, PHOTOELECTRIC CONVERSION CIRCUIT AND TEST APPARATUS

The present application is a continuation application of PCT/JP02/10245 filed on Oct. 2, 2002, which claims priority from a Japanese Patent application No. 2001-312050 filed on Oct. 9, 2001, the entire contents of which are incorporated herein by reference for all purposes.

BACKGROUND OF THE INVENTION

1. Field of the Invention

The present invention relates to a photoelectric conversion circuit for performing photoelectric conversion, a data transmission apparatus for performing data transmission, and a test apparatus for testing an electronic device. More particularly, the present invention relates to a data transmission apparatus based on optical transmission.

2. Related Art

In data communication, the trend towards higher speed and larger capacity is recently significant. In short distance transmission such as indoor transmission, parallel optical transmission is now the prevailing method, when performing large-sized data communication at high-speed. A data transmission apparatus for performing data transmission by the parallel optical transmission includes a plurality of channels, each of which consists of a laser diode, an optical fiber, and a photodiode, and uses the channels to perform data transmission.

In accordance with the trend towards high speed data communication, however, there occurs a problem of skew between the channels. For example, due to the skew, the speed of data communication is restricted. In the conventional data transmission apparatus, a complicated framing circuit and a coding circuit are provided to the transmitter side, whereas an encoding circuit being provided to the receiver side, to reduce the skew, but there occurs a problem that the power consumption is high, and the response decreases.

Also, even in the test apparatus to test the electronic device, in accordance with the trend towards a high speed device under test and a small-sized test apparatus, it is desirable that a data transmission apparatus used for data communication have high speed, small size, high density, and low power consumption characteristics.

SUMMARY OF THE INVENTION

Accordingly, it is an object of the present invention to provide a data transmission apparatus, a photoelectric conversion circuit, and a test apparatus, which is capable of overcoming the above drawbacks accompanying the conventional art. The above and other objects can be achieved by combinations described in the independent claims. The dependent claims define further advantageous and exemplary combinations of the present invention.

In order to solve the problems above, according to the first aspect of the present invention, a data transmission apparatus for performing data communication based on optical transmission includes a transmitting unit for converting and sending electric communication data, which is to be transmitted, into optical communication data, a photoelectric conversion circuit for receiving the optical communication data and converting the received optical communication data into the electric communication data, and a variable setting unit for setting the photoelectric conversion circuit to generate predetermined electric communication data in response to a level of predetermined optical communication data.

The photoelectric conversion circuit may include a light receiving unit for generating a current based on the received optical communication data, and a signal generating unit for generating the electric signal based on the current generated by the light receiving unit, and the variable setting unit may include a variable current supply for setting the photoelectric conversion circuit by subtracting a predetermined current value from a current value indicating magnitude of the current generated by the light receiving unit.

The photoelectric conversion circuit may include a light receiving unit for generating a current based on the received optical communication data, and a comparator for comparing a current value, which indicates magnitude of the current generated by the light receiving unit, with a reference current and generating the electric communication data, and the variable setting unit may include a variable current supply for setting the photoelectric conversion circuit by adding a predetermined current value to the reference current.

The data transmission apparatus may further include a plurality of the transmitting units, a plurality of optical waveguides for propagating pieces of the optical communication data sent from the transmitting units respectively, and a plurality of the photoelectric conversion circuits in response to the transmitting units respectively, wherein each of the variable setting units of the photoelectric conversion circuits may set the corresponding photoelectric conversion circuit to generate predetermined electric communication data in response to a level of predetermined optical communication data.

The variable setting unit may set the photoelectric conversion circuit based on a transmission delay time of the optical communication data and electric communication data between the corresponding transmitting unit and photoelectric conversion circuit.

The variable setting unit may set the photoelectric conversion circuit further based on attenuation of the optical communication data with regard to the corresponding optical waveguide.

The variable setting unit may set the photoelectric conversion circuit further based on electro-optic conversion efficiency of the electric communication data with regard to the corresponding transmitting unit.

The variable setting unit may set the photoelectric conversion circuit further based on photoelectric conversion efficiency of the optical communication data with regard to the corresponding photoelectric conversion circuit.

The optical communication data maybe digital data, and the variable current supply may subtract a current value, which is substantially half the current generated by the light receiving unit when the optical communication data indicates H logic, from the current value generated by the light receiving unit.

The optical communication data may be digital data, and the variable current supply may subtract a substantially average current value of the current, which is generated by the light receiving unit when the optical communication data indicates H logic, and the current, which is generated by the light receiving unit when the optical communication data indicates L logic, from the current value indicating the magnitude of the current generated by the light receiving unit.

The optical communication data maybe digital data, and the variable current supply may add a current value, which is substantially half the current generated by the light receiving unit when the optical communication data indicates H logic, to a value of the reference current.

The optical communication data maybe digital data, and the variable current supply may add a substantially average current value of the current, which is generated by the light receiving unit when the optical communication data indicates H logic, and the current, which is generated by the light receiving unit when the optical communication data indicates L logic, to a value of the reference current.

The transmitting unit may include a laser diode for generating the optical communication data based on the electric communication data, and a bias current supply for supplying a bias current larger than a laser oscillation threshold current of the laser diode to the laser diode.

According to the second aspect of the present invention, a test apparatus for testing an electronic device includes a pattern generating unit for generating a test signal to test the electronic device, a waveform adjusting unit for adjusting the test signal, a test head for contacting the electronic device, a data transmission apparatus for transmitting data between the waveform adjusting unit and the test head, and a judging unit for judging quality of the electronic device based on an output signal outputted by the electronic device in response to the test signal, wherein the data transmission apparatus includes a transmitting unit for converting and sending the test signal in to optical communication data, a photoelectric conversion circuit for receiving the optical communication data and converting the received optical communication data into the test signal, and a variable setting unit for setting the photoelectric conversion circuit to generate a predetermined test signal in response to a level of predetermined optical communication data.

According to the third aspect of the present invention, a photoelectric conversion circuit for receiving light and converting the received light into electricity includes a photodiode for generating a current based on the received light, and a variable current supply for generating a current to offset the current generated by the photodiode.

The summary of the invention does not necessarily describe all necessary features of the present invention. The present invention may also be a sub-combination of the features described above.

BRIEF DESCRIPTION OF THE DRAWINGS

FIGS. 2A and 2B show an example of the configuration of a data transmission apparatus 60. Specifically, FIG. 2A schematically shows the configuration of a data transmission apparatus 60.

FIG. 3A shows an example of the configuration of a transmitting unit 62. FIG. 3B shows an example of the configuration of a receiving unit 68.

FIGS. 4A, 4B and 4C show another example of the configuration of a receiving unit 68. Specifically.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
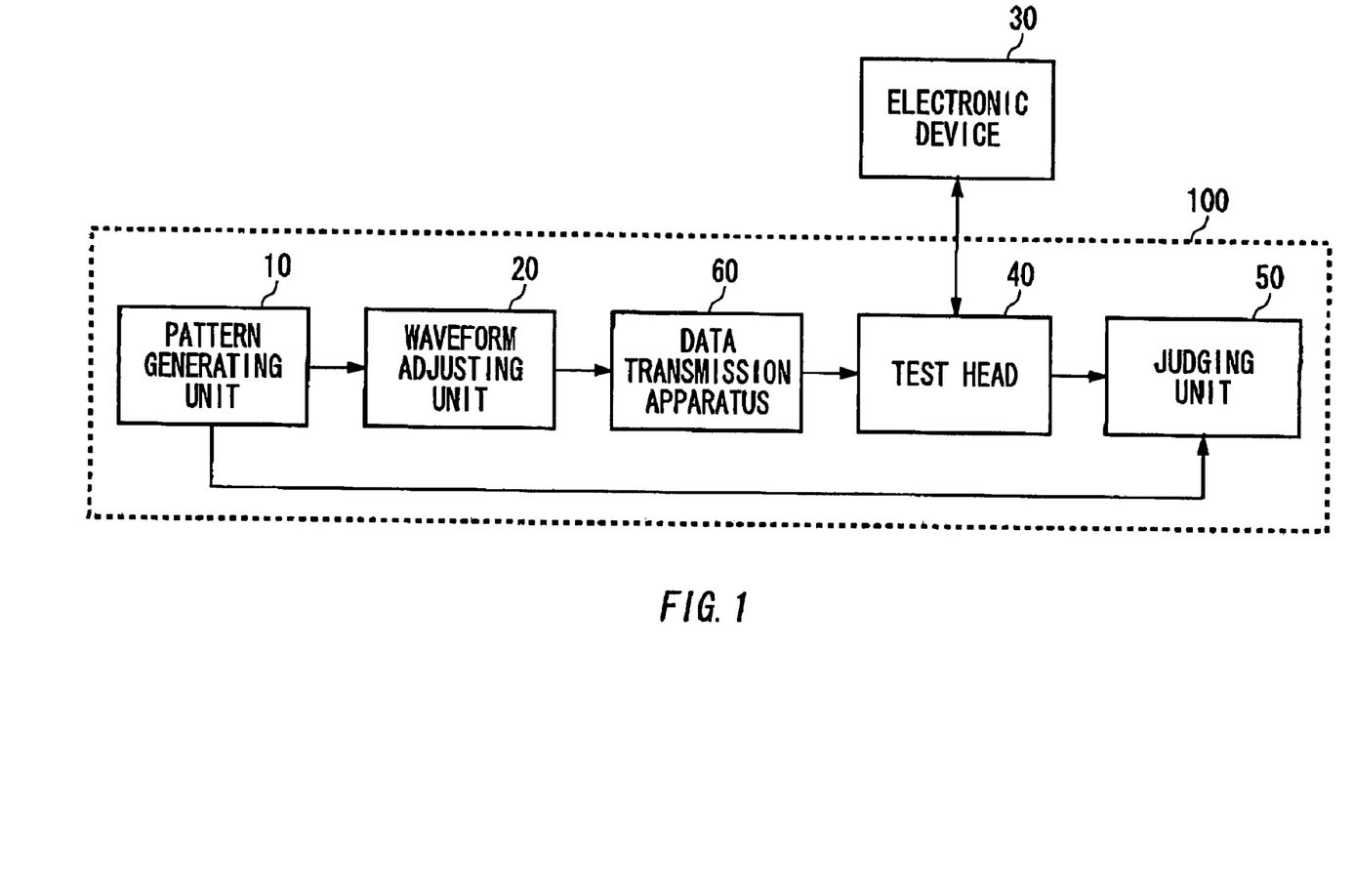
FIG. 1 shows an example of the configuration of a test apparatus 100 related to the present invention.

FIG. 1 shows an example of the configuration of a test apparatus 100 related to the present invention. The test apparatus 100 performs the test of an electronic device 30. The test apparatus 100 includes a pattern generating unit 10, a waveform adjusting unit 20, a data transmission apparatus 60, and a judging unit 50.

The pattern generating unit 10 generates a test signal for the test of the electronic device 30, and supplies it to the waveform adjusting unit 20. And the pattern generating unit 10 generates an expected signal which the electronic device 30 is supposed to output when receiving the test signal, and supplies it to the judging unit 50.

The waveform adjusting unit 20 adjusts the test signal received, and supplies it to the data transmission apparatus 60. The waveform adjusting unit 20 may supply the test signal adjusted at desired timing.

The data transmission apparatus 60 supplies the received test signal to the test head 40. The data transmission apparatus 60 converts electric communication data into optical communication data in order to transmit the data.

In this embodiment, the data transmission apparatus 60 is an optical transmission apparatus for converting the test signal as an example of the electric communication data into optical communication data to transmit the data, and restoring the transmitted optical communication data in to the test signal. Since the test signal is transmitted to the test head 40 based on optical transmission, the data transmission can performed at high speed even though the pattern generating unit 10 and the waveform adjusting unit 20 are distanced from the test head 40.

The test head 40 contacts the electronic device 30 to send and receive signals with the electronic device 30. For example, the test head 40 supplies the received test signal to the electronic device 30, and receives the output signal outputted by the electronic device 30. The test head 40 supplies the received output signal to the judging unit 50. And the test head 40 may contact a plurality of electronic devices 30 to perform signal transmission.

The judging unit 50 judges the quality of the electronic device 30 based on the output signal outputted by the electronic device 30 in response to the test signal. The judging unit 50 compares the expected signal generated by the pattern generating unit 10 with the output signal outputted by the electronic device 30 to judge the quality of the electronic device 30.

Figure 2A:
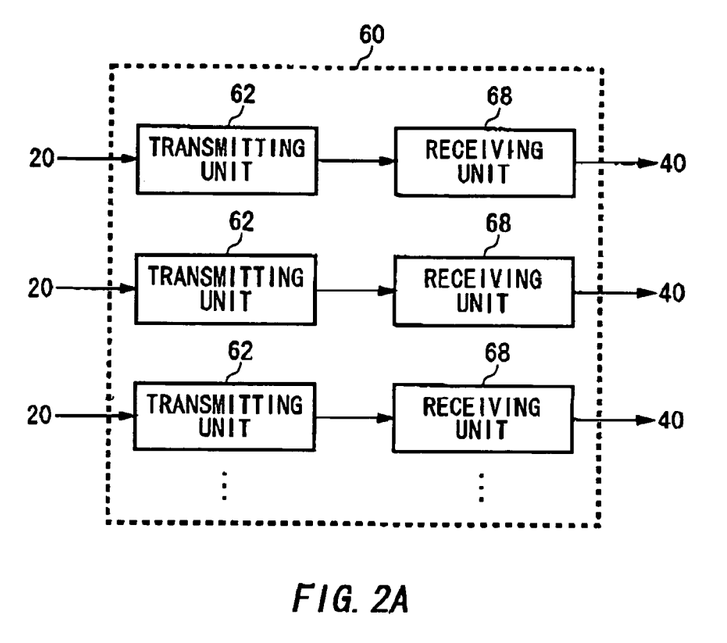
Figure 2B:
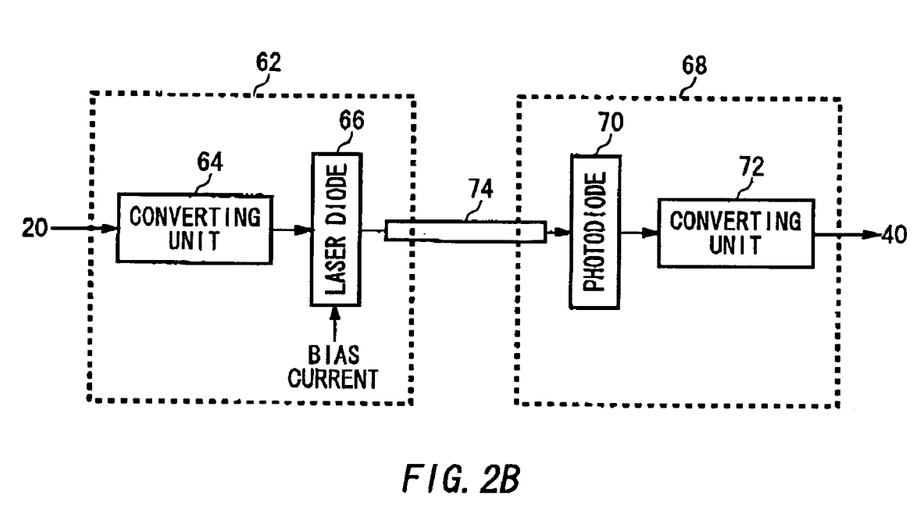
FIG. 2B shows an example of the configuration of a transmitting unit 62 and a receiving unit 68.

FIGS. 2A and 2B show an example of the configuration of the data transmission apparatus 60. FIG. 2A schematically shows the configuration of the data transmission apparatus 60. The data transmission apparatus 60 includes a plurality of transmitting units 62 and a plurality of receiving units 68. The transmitting units 62 convert and send the transmitted electric communication data into optical communication data.

In this embodiment, the transmitting units 62 receive the test signals from the waveform adjusting unit 20, and convert and send the test signals into optical communication data.

The receiving units 68 receive the optical communication data sent from the transmitting units 62, and convert the received optical communication data into the electric communication data. In this embodiment, the receiving units 68 convert the received optical communication data into the test signal, and supply the data to the test head 40.

And the data transmission apparatus 60 includes optical fibers which are an example of optical waveguides between the transmitting units 62 and the receiving units 68. The transmitting units 62 send the optical communication data to the receiving units 68 via the optical fibers. In addition, the data transmission apparatus 60 may include a serial-parallel converting unit for receiving serial data as the test signal from the waveform adjusting unit 20 and converting the test signal into parallel data, and a parallel-serial converting unit for converting the test signals outputted by the receiving units 68 into the serial data.

FIG. 2B shows an example of the configuration of a transmitting unit 62 and a receiving unit 68. The receiving unit 62 includes a converting unit 64 and a laser diode 66. The converting unit 64 modulates the test signal. The laser diode 66 generates the optical communication data based on the electric communication data, and sends the data to the optical fiber 74. In this embodiment, the laser diode 66 converts the modulated test signal into the optical communication data, and sends the data to the optical fiber 74. In addition, the laser diode 66 is given a bias current larger than the laser oscillation threshold current of the laser diode 66. Since the laser diode 66 is given a bias current larger than the laser oscillation threshold current of the laser diode 66, the light emission delay time of the laser diode 66 can be reduced, and the deviation of the light emission delay time of each laser diode 66 of the transmitting units 62 can be reduced. Although the light emission delay time depends on the pattern of the test signal when the bias current is smaller than the laser oscillation threshold current, according to the transmitting units 62 of this embodiment, the light emission delay time of the laser diode 66 can be constant regardless of pattern of the test signal. In addition, since the laser diode 66 is given a bias current larger than the laser oscillation threshold current of the laser diode 66, the relaxation oscillation can be decreased at the rise and fall of the waveform of the optical communication data generated by the laser diode 66.

The receiving unit 68 converts the optical communication data sent from the transmitting units 62 into the test signal. The receiving unit 68 includes a light receiving unit and a converting unit 72. In this embodiment, the light receiving unit includes a photodiode 70. The photodiode 70 generates a current based on the optical communication data received. The photodiode 70 is given a bias voltage. The converting unit 72 converts the current generated by the photodiode 70 into the test signal.

Figure 3A:
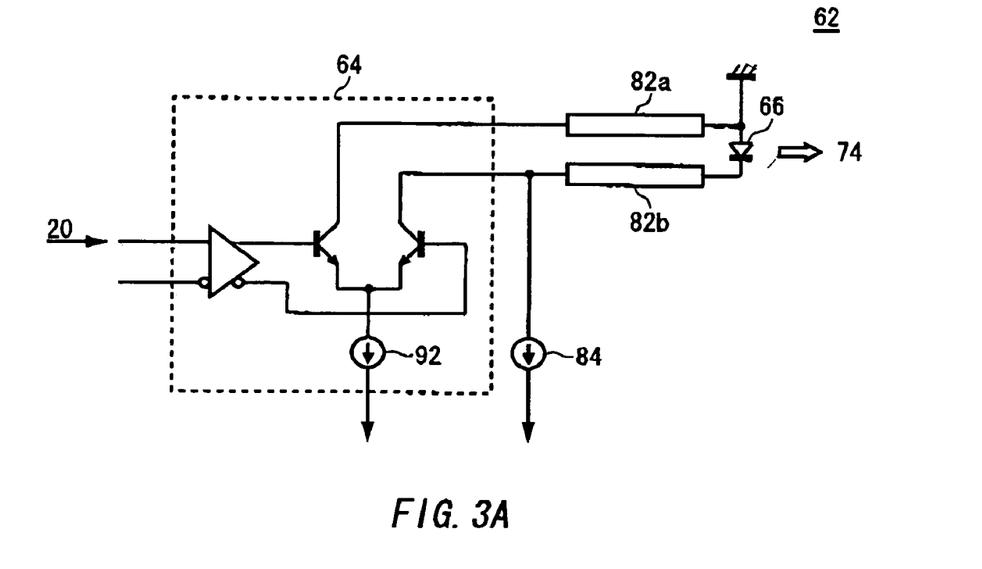
FIGS. 3A and 3B show an example of the configuration of a transmitting unit 62 and a receiving unit 68. Specifically.
Figure 3B:
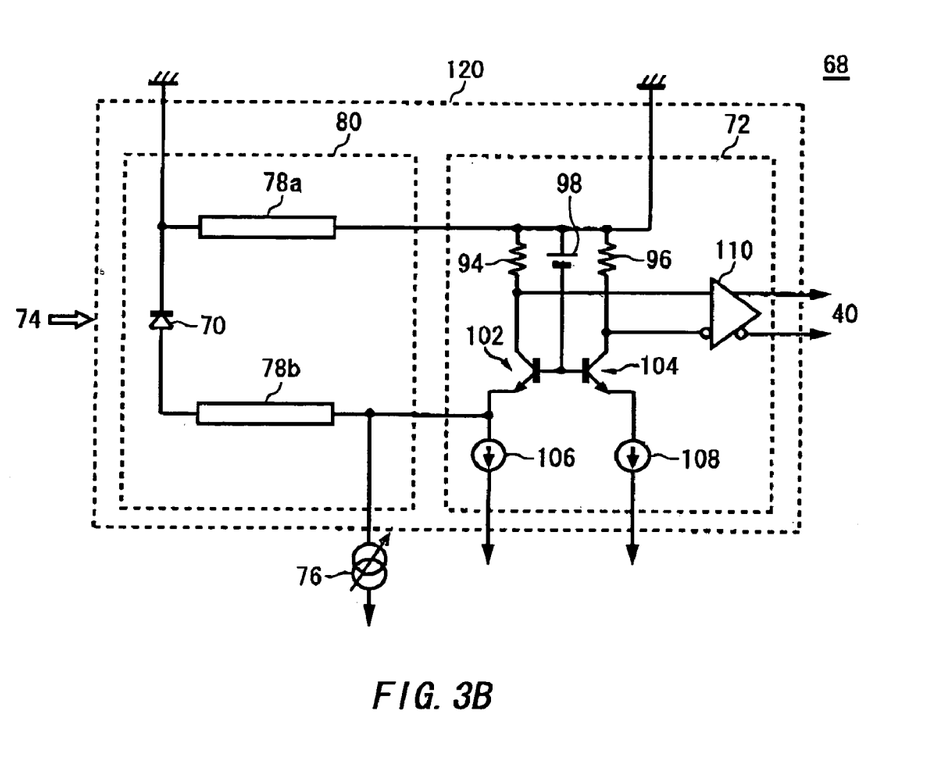

FIGS. 3A and 3B show an example of the configuration of a transmitting unit 62 and a receiving unit 68. FIG. 3A shows an example of the configuration of the transmitting unit 62. The transmitting unit 62 includes a converting unit 64, a laser diode 66, and a current supply 84. In this embodiment, the converting unit 64 receives the test signal from the waveform adjusting unit 20, and modulates and supplies the strength of the received test signal to the laser diode 66.

The laser diode 66 generates the optical communication data based on the test signal received, and sends the data to the optical fiber 74. As above, the current supply 84 supplies a bias current larger than the laser oscillation threshold current of the laser diode 66 to the laser diode 66. The cathode of the laser diode 66 and the current supply 84 are electrically coupled via the path 82b. The anode of the laser diode 66 is electrically coupled to the converting unit 64 via the path 82a. The impedance of the paths 82a and 82b is preferably the same as the forward-biased impedance of the laser diode 66. The paths 82 may be microstrip lines. Since the impedance of the paths 82a and 82b is approximately the same as that of an equivalent circuit of the laser diode, the reflection of the signal at the contact point between the paths 82 and the laser diode 66 can be reduced, and the deterioration of the signal waveform can be reduced.

FIG. 3B shows an example of the configuration of the receiving unit 68. The receiving unit 68 includes a photoelectric conversion circuit 120 and a variable setting unit. The photoelectric conversion circuit 120 includes a light receiving unit 80 and a converting unit 72. The light receiving unit 80 includes a photodiode 70 as described above to convert the optical communication data into a current. In this embodiment, the light receiving unit 80 generates a current based on the optical communication data, and supplies the generated current to the converting unit 72. The converting unit 72 may be a current-voltage converter for converting the current generated by the light receiving unit 80 into the voltage. The converting unit 72 outputs the test signal which is electric communication data based on the current generated by the light receiving unit 80. The variable setting unit sets the photoelectric conversion circuit to generate predetermined electric communication data in response to the level of the optical communication data. In this embodiment, the variable setting unit is a variable current supply 76.

The light receiving unit 80 includes a photodiode 70 and paths 78. The photodiode 70 generates a current based on the optical communication data. When the photodiode 70 generates a current, the emitter current of a first transistor 102 described below decreases. The variable current supply 76 is electrically coupled to the anode of the photodiode 70. Since the variable current supply 76 is provided, the emitter current of the first transistor 102 increases. In other words, the variable current supply 76 subtracts a predetermined current from a current value indicating the magnitude of the current generated by the photodiode 70, and adds an offset to the output of the photodiode 70. The photoelectric conversion circuit 80 supplies the current subtracted by the variable current supply 76 to the converting unit 72.

The converting unit 72 includes a first resistor 94, a second resistor 96, a voltage supply 98, a first transistor 102, a second transistor 104, a first current supply 106, a second current supply 108, and a comparator 110.

As shown in FIG. 3B, the first resistor 94 is provided in parallel to the photodiode 70, and its one end is electrically coupled to the cathode of the photodiode 70. The first transistor 102 is provided in series to the first resistor 94, its collector terminal is electrically coupled to the other end of the first resistor 94, and the emitter terminal is electrically coupled to the variable current supply 76. The first current supply 106 is electrically coupled to the emitter terminal of the first transistor 102, and provided in parallel to the variable current supply 76. The voltage supply 98 applies a predetermined voltage to the base terminal of the first transistor 102. The comparator 110 compares a current changing in response to the magnitude of the current generated by the light receiving unit 80, i.e. a current flowing through the first resistor 94 with a reference current flowing through the second resistor 96, and generates the electric communication data. In this embodiment, the comparator 110 judges whether the collector voltage of the first transistor 102 based on the current flowing through the first resistor 94 is larger than the reference value of the reference current or not.

The second resistor 96 is provided in parallel to the first resistor 94, and electrically coupled to the ground at its one end. The second transistor 104 is provided in series to the second resistor 96, and its collector terminal is electrically coupled to the second resistor 96. The first transistor 102, as shown in FIG. 3B, is an emitter-input base-ground transistor. Since the first transistor 102 is provided, the input impedance of the converting unit 72 can be reduced. The second current supply 108 is electrically coupled to the emitter terminal of the second transistor 104, and provided in parallel to the variable current supply 76. In addition the voltage supply 98 applies a predetermined voltage to the base terminal of the second transistor 104, and the comparator 110 receives the collector voltage of the second transistor 104 as the reference value described above. As shown in FIG. 3B, it is shown that the reference value is approximately constant. The ratio of resistance of resistors 94 and 96 can be easily set with high precision. Accordingly, the comparator 110 can judge H or L logic of the signal flowing through the resistor 94 with high precision.

In addition, although the comparator 110 receives the collector voltage of the second transistor 104 as the reference value, alternatively, the converting unit 72 may include a second voltage supply generating a predetermined voltage, and the comparator 110 may receive the reference value from the second voltage supply.

In this embodiment, the impedance of the first resistor 94 is approximately the same as that of the second resistor 96. In addition, the first and second transistors 102 and 104 have approximately the same characteristics. In addition, the first and second power supplies 106 and 108 generate approximately the same current.

In this embodiment, it is preferable that the impedance of the path 78b be approximately the same as the input impedance of the emitter of the first transistor 102. Since the impedance of the path 78b is approximately the same as the input impedance of the emitter of the first transistor 102, the reflection of the signal at the contact point between the path 78b and the first transistor 102 can be reduced. The paths 78 may be microstrip lines.

Hereinafter, the operation of the receiving unit 68 will be described. When the photo diode 70 receives H logic, the photodiode 70 generates a reverse current, and the current flowing through the resistor 94 changes. The comparator 110 judges whether the photodiode 70 receives H or L logic based on the change in the current.

Since the laser diode 66 of the transmitting units 62 in this embodiment is given a bias current larger than the laser oscillation threshold current, it always emits light. Accordingly, the photodiode 70 always detects the light, and generates the current. Therefore, although L logic is transmitted as the optical communication data, there is a possibility that the current generated by the photodiode 70 becomes zero. The variable current supply 76 subtracts a predetermined current from the current generated by the photodiode 70. Accordingly, even if the photodiode 70 generates the current described above, the comparator 110 can detect H or L logic.

In this embodiment, the variable current supply 76 subtracts a current, which is equivalent to the approximately average value of the currents generated by the photodiode 70 when receiving H and L logics respectively, from the current generated by the photodiode 70. In addition, the variable current supply 76 may subtract a current, which is approximately half the value of the current generated by the photodiode 70 when receiving H logic, from the current generated by the photodiode 70.

The receiving units 68 may include means for detecting the current value generated by the photodiode 70, and a controlling unit for controlling the amount of current to be subtracted by the variable current supply 76 based on the detected current value. For example, each of the transmitting units 62 detects H or L logic in advance, and the receiving unit 68 preferably calibrates the amount of current with regard to the variable current supply 76 in advance based on the current value generated by the photodiode 70 when the transmitting unit 62 detects H or L logic.

In addition, since the characteristics such as attenuation of each of optical fibers 74 of a plurality of channels, the electro-optic conversion efficiency of the laser diode 66 in response to each of the channels, and the photoelectric conversion efficiency of the photodiode in response to each of the channels are different, the photodiodes 70 might generate different currents respectively, even if sending the same signal to the channels. The variable current supply 76 may subtract the current for the adjustment of that deviation from the current generated by the photodiode 70.

As above, according to the data transmission apparatus 60 in this embodiment, since the laser diode 66 is given a bias current larger than the laser oscillation threshold current, the deviation of the data delay time in the transmitting unit 62 can be reduced. In addition, since the variable current supply 76 is provided in the receiving unit 68, the skew between the channels can be reduced, and the comparator 110 can detect H and L logics with high precision. Accordingly, the test apparatus 100 can test the electronic device 30 highly accurately and efficiently.

In addition, it is obvious that the data transmission apparatus 60 described in connection with FIGS. 1 to 3 can also be used in general parallel data transmission. Even in the general parallel data transmission, it is possible to obtain the same effect as that of the data transmission apparatus 60 described in connection with FIGS. 1 to 3.

In addition, although the variable current supply 76 in this embodiment is electrically coupled to the anode of the photodiode 70, alternatively, the variable current supply 76 may be coupled to another position. Hereinafter, another example of the configuration of the receiving unit 68 will be described.

Figure 4A:
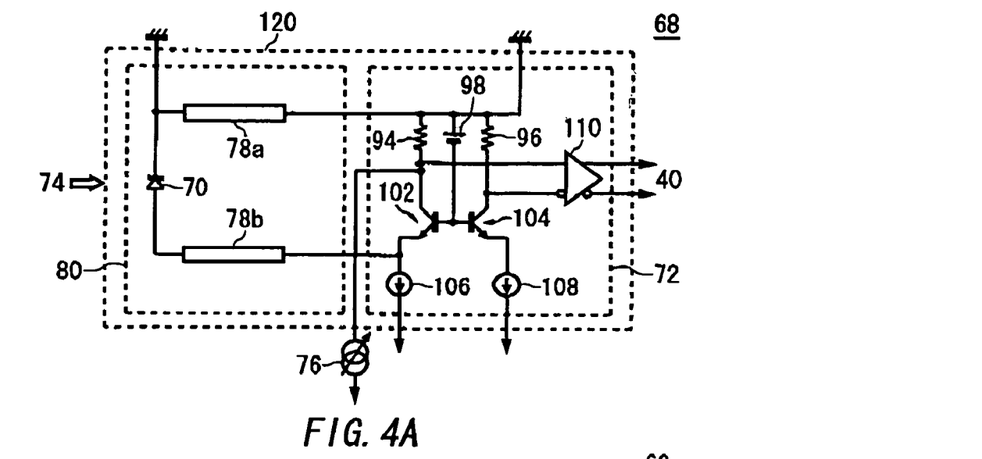
FIG. 4A shows a variable current supply 76 being electrically coupled to the collector terminal of a first transistor 102.
Figure 4B:
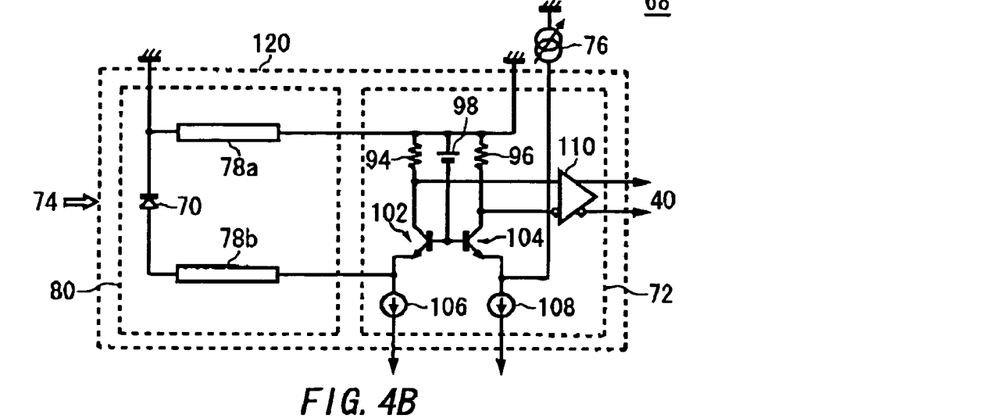
FIG. 4B shows further another example of a receiving unit 68.
Figure 4C:
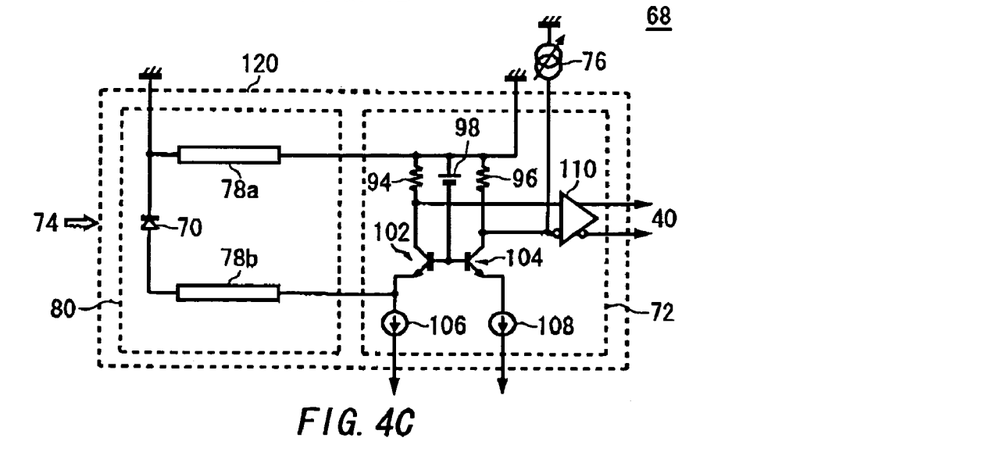
FIG. 4C shows further another example of a receiving unit 68.

FIGS. 4A to 4C show another example of the configuration of the receiving unit 68. The variable current supply 76 related to FIGS. 4A to 4C has the same or similar configuration as that of the variable current supply 76 described in connection with FIGS. 3A and 3B. FIG. 4A shows the variable current supply 76 being electrically coupled to the collector terminal of the first transistor 102. The variable current supply 76 subtracts a predetermined current from the current flowing through the first resistor 94, i.e. the current changing in response to the magnitude of the current generated by the light receiving unit 80. In other words, the variable current supply 76 subtracts a predetermined current value from the current indicating the magnitude of the current generated by the light receiving unit 80, and adds an offset to the output of the photodiode 70 equivalently. The data transmission apparatus 60 of this embodiment can also provide the same effect as the data transmission apparatus 60 described in connection with FIG. 3.

FIG. 4B shows further another example of the receiving unit 68. In this embodiment, the variable current supply 76 is electrically coupled to the emitter terminal of the second transistor 104. The variable current supply 76 sets the photoelectric conversion circuit 120 by adding a predetermined current value to a reference current value of the comparator 110. In other words, the variable current supply 76 adds a predetermined current value to the reference current of the comparator 110 to add an offset to the output of the photodiode 70 equivalently. The data transmission apparatus 60 of this embodiment can also provide the same effect as the data transmission apparatus 60 described in connection with FIG. 3.

FIG. 4C shows further another example of the receiving unit 68. In this embodiment, the variable current supply 76 is electrically coupled to the inverting input of the comparator 110. Also in this embodiment, like the example shown in FIG. 4B, the variable current supply 76 adds a predetermined current value to the reference current of the comparator 110 to add an offset to the output of the photodiode 70 equivalently. The data transmission apparatus 60 of this embodiment can also provide the same effect as the data transmission apparatus 60 described in connection with FIG. 3.

In addition, although the variable setting unit in this embodiment is the variable current supply 76, alternatively, the variable setting unit may change the resistance of the first or second resistor 94 or 96. In other words, the variable setting unit may change the resistance of the first or second resistor 94 or 96 which is a variable resistor in order to add an offset to the output of the photodiode 70. In this case, the variable setting unit may change the resistance of the first or second resistor 94 or 96 in response to the current values generated by the photodiode 70 when receiving H and L logics. In further another embodiment, the variable setting unit may be a variable voltage supply. For example, the variable voltage supply may be provided in series between the first or second resistor 94 or 96 and the ground.

Although the present invention has been described by way of exemplary embodiments, it should be understood that those skilled in the art might make many changes and substitutions without departing from the spirit and the scope of the present invention, which is defined only by the appended claims.

INDUSTRIAL APPLICABILITY

As obvious from the description above, according to a data transmission apparatus of the present invention, it is possible to preform data communication with low transmission skew between channels. In addition, the test apparatus can perform the test of the electronic device highly accurately and efficiently.

What is claimed is:

1. A data transmission apparatus for performing data communication based on optical transmission, comprising:
a transmitting unit for converting and sending electric communication data to be transmitted into optical communication data;
a photoelectric conversion circuit for receiving said optical communication data and converting said received optical communication data into received electric communication data; and
a variable setting unit for setting said photoelectric conversion circuit to generate received electric communication data in response to an input level of said received optical communication data,
wherein said photoelectric conversion circuit comprises:
a light receiving unit for generating a current based on said received optical communication data; and
a signal generating unit for generating said received electric communication data based on said current generated by said light receiving unit,
a comparator for comparing a current, the value of which indicates a magnitude of said current generated by said light receiving unit, with a reference current, and for generating said received electric communication data,
and wherein said variable setting unit comprises a variable current supply for setting said photoelectric conversion circuit by adding a predetermined current to said reference current or by subtracting a predetermined current from the current, the value of which indicates the magnitude of said current generated by said light receiving unit,
wherein said optical communication data is digital data, and said variable current supply subtracts a current value, which is substantially half said current generated by said light receiving unit when said optical communication data indicates H logic, from said current value generated by said light receiving unit.

2. A data transmission apparatus for performing data communication based on optical transmission, comprising:
a transmitting unit for converting and sending electric communication data to be transmitted into optical communication data;
a photoelectric conversion circuit for receiving said optical communication data and converting said received optical communication data into received electric communication data; and
a variable setting unit for setting said photoelectric conversion circuit to generate received electric communication data in response to an input level of said received optical communication data,
wherein said photoelectric conversion circuit comprises:
a light receiving unit for generating a current based on said received optical communication data; and
a signal generating unit for generating said received electric communication data based on said current generated by said light receiving unit,
a comparator for comparing a current, the value of which indicates a magnitude of said current generated by said light receiving unit, with a reference current, and for generating said received electric con-in-lunication data,
and wherein said variable setting unit comprises a variable current supply for setting said photoelectric conversion circuit by adding a predetermined current to said reference current or by subtracting a predetermined current from the current, the value of which indicates the magnitude of said current generated by said light receiving unit,
wherein said optical communication data is digital data, and said variable current supply subtracts a substantially average current value of the current generated by said light receiving unit when said optical communication data indicates H logic and the current generated by said light receiving unit when said optical communication data indicates L logic, from said current value indicating said magnitude of said current generated by said light receiving unit.

3. A data transmission apparatus for performing data communication based on optical transmission, comprising:
a transmitting unit for converting and sending electric communication data to be transmitted into optical communication data;

a photoelectric conversion circuit for receiving said optical communication data and converting said received optical communication data into received electric communication data; and a variable setting unit for setting said photoelectric conversion circuit to generate received electric communication data in response to an input level of said received optical communication data, wherein said photoelectric conversion circuit comprises:

a light receiving unit for generating a current based on said received optical communication data; and a comparator for comparing a current, the value of which indicates a magnitude of said current generated by said light receiving unit, with a reference current, and for generating said received electric communication data, and wherein said variable setting unit comprises a variable current supply for setting said photoelectric conversion circuit by adding a predetermined current to said reference current or by subtracting a predetermined current from the current, the value of which indicates the magnitude of said current generated by said light receiving unit, wherein said optical communication data is digital data, and said variable current supply adds a current value, which is substantially half said current generated by said light receiving unit when said optical communication data indicates H logic, to a value of said reference current.

4. A data transmission apparatus for performing data communication based on optical transmission, comprising:

a transmitting unit for converting and sending electric communication data to be transmitted into optical communication data;

a photoelectric conversion circuit for receiving said optical communication data and converting said received optical communication data into received electric communication data; and a variable setting unit for setting said photoelectric conversion circuit to generate received electric communication data in response to an input level of said received optical communication data, wherein said photoelectric conversion circuit comprises:

a light receiving unit for generating a current based on said received optical communication data; and a comparator for comparing a current, the value of which indicates a magnitude of said current generated by said light receiving unit, with a reference current, and for generating said received electric communication data, and wherein said variable setting unit comprises a variable current supply for setting said photoelectric conversion circuit by adding a predetermined current to said reference current or by subtracting a predetermined current from the current, the value of which indicates the magnitude of said current generated by said light receiving unit, wherein said optical communication data is digital data, and said variable current supply adds a substantially average current value of the current generated by said light receiving unit when said optical communication data indicates H logic and the current generated by said light receiving unit when said optical communication data indicates L logic, to a value of said reference current.

5. A test apparatus for testing an electronic device, comprising:

a pattern generating unit for generating a test signal to test said electronic device;

a waveform adjusting unit for adjusting said test signal;

a test head for contacting said electronic device;

a data transmission apparatus for transmitting data between said waveform adjusting unit and said test head; and a judging unit for judging quality of said electronic device based on an output signal outputted by said electronic device in response to said test signal, wherein said data transmission apparatus comprises:

a transmitting unit for converting and sending said test signal into optical communication data;

a photoelectric conversion circuit for receiving said optical communication data and converting said received optical communication data into said test signal; and a variable setting unit for setting said photoelectric conversion circuit to generate a predetermined test signal in response to an input level of said received optical communication data, wherein said photoelectric conversion circuit comprises:

a light receiving unit for generating a current based on said received optical communication data; and a comparator for comparing a current, the value of which indicates a magnitude of said current generated by said light receiving unit, with a reference current, and for generating said test signal, and wherein said variable setting unit comprises a variable current supply for setting said photoelectric conversion circuit by adding a predetermined current to said reference current or by subtracting a predetermined current from the current, the value of which indicates the magnitude of said current generated by said light receiving unit.

6. The test apparatus as claimed in claim 5, wherein said reference current is generated by a current supply.

7. The test apparatus as claimed in claim 5, further comprising:

a laser diode for generating data; and a plurality of optical waveguides for propagating data.

* * * * *